Dec. 7, 1954  J. A. HERRMANN ET AL  2,696,532
TROLLEY TYPE ELECTRIC CURRENT COLLECTOR
Filed July 1, 1950  3 Sheets-Sheet 1

INVENTORS.
John A. Herrmann.
Elwood T. Platz.
BY
A. Eugene Bychinsky
THEIR ATTORNEY.

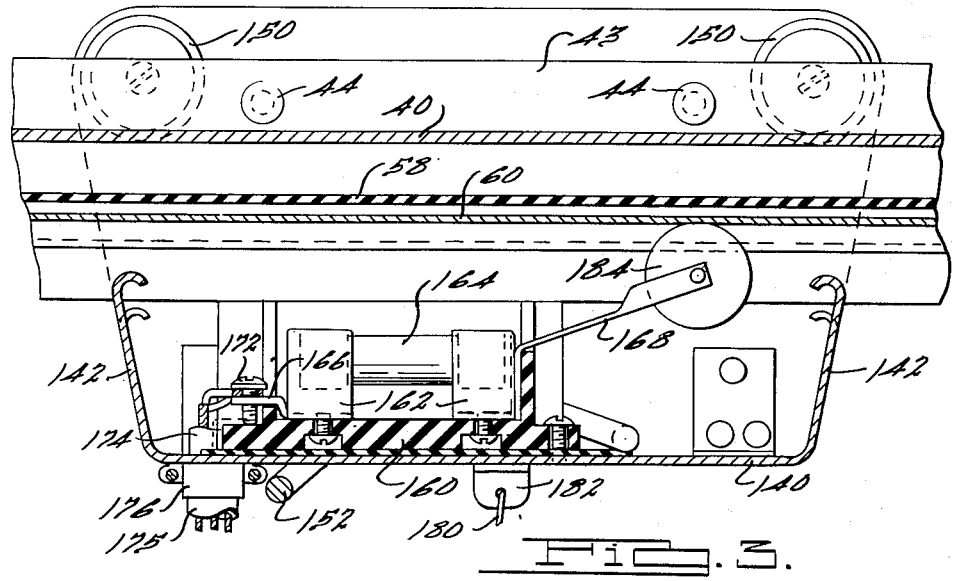
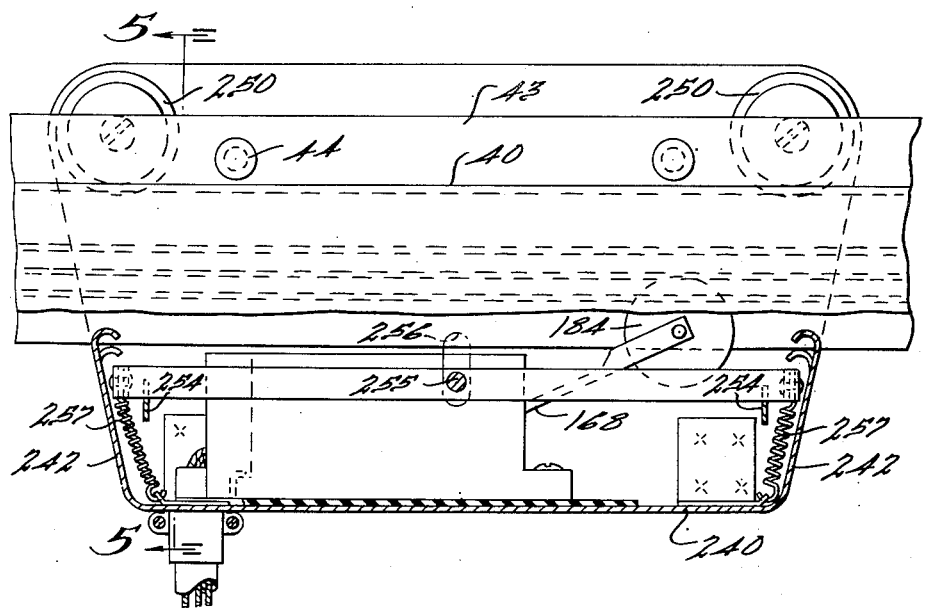

Dec. 7, 1954    J. A. HERRMANN ET AL    2,696,532
TROLLEY TYPE ELECTRIC CURRENT COLLECTOR
Filed July 1, 1950                     3 Sheets-Sheet 3
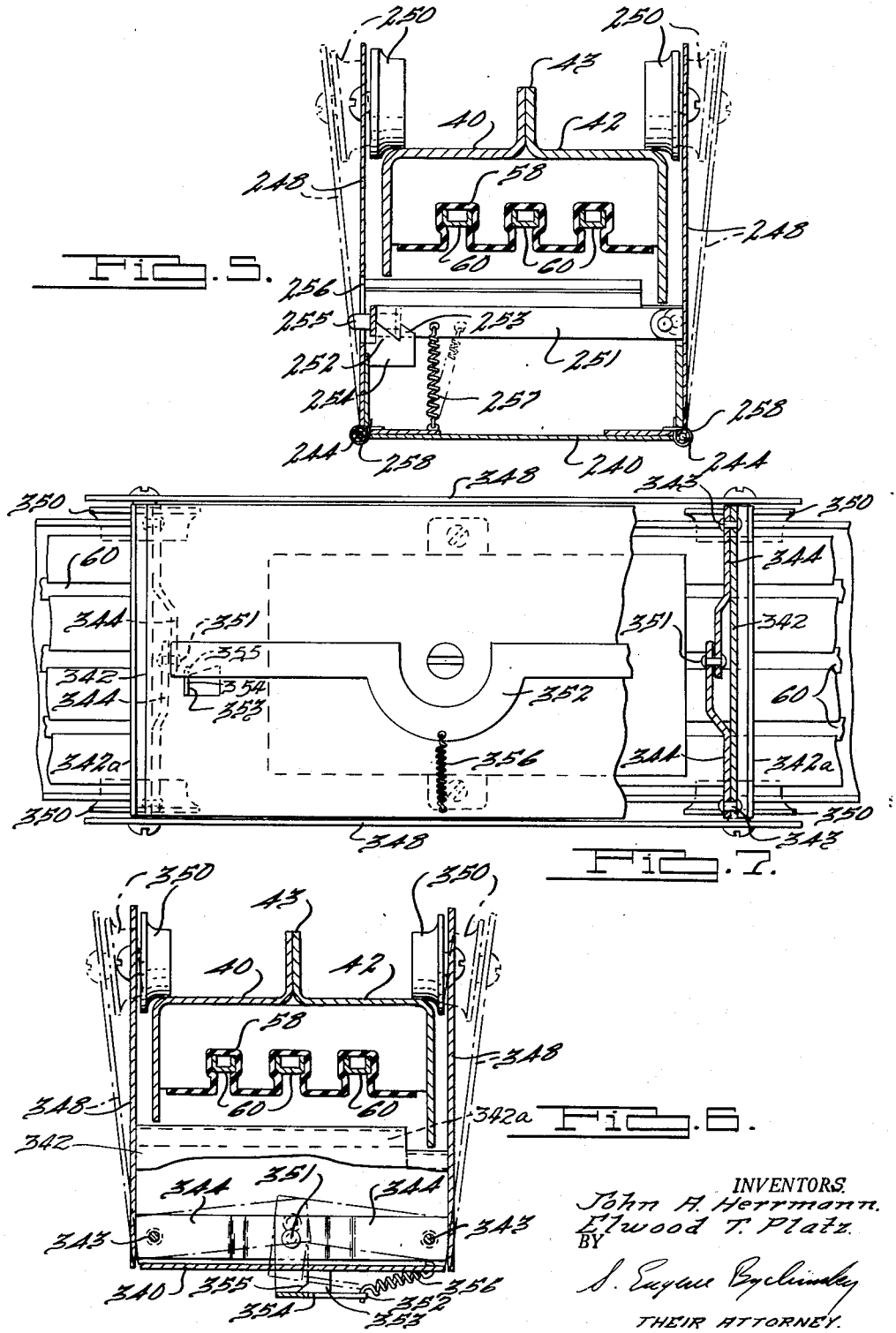
INVENTORS.
John A. Herrmann.
Elwood T. Platz.
BY
S. Eugene Byclinsky
THEIR ATTORNEY.

United States Patent Office 2,696,532
Patented Dec. 7, 1954

2,696,532

TROLLEY TYPE ELECTRIC CURRENT COLLECTOR

John A. Herrmann, Grosse Pointe Farms, and Elwood T. Platz, Detroit, Mich., assignors to BullDog Electric Products Co., Detroit, Mich., a corporation of West Virginia Application July 1, 1950, Serial No. 171,588

2 Claims. (Cl. 191—23)

This invention relates to electrical distribution systems of the trolley duct type, and particularly to novel trolleys useful in such systems.

A principal object of the present invention is to provide a novel type of trolley arranged to provide a high degree of smoothness of movement along the duct and also arranged to be separable so as to be readily applicable to or removable from a duct at any point thereof.

A further object is to provide a novel form of trolley useful particularly with a duct of the open channel type with the trolley having sides and a bottom which completely shield the trolley contacts at their points of engagement with the bus bars.

Generally, the trolleys hereof comprise a bottom plate and side plates with the latter having rollers for riding on the upper surface of the channel duct. The lower or bottom surface of the trolley is formed with upwardly projecting contactors or collectors which engage the under surfaces of bus bars that may be mounted in the channel duct and exposed to the open bottom of the duct. The bottom wall of the trolley may be formed with upwardly extending end portions to complete the enclosure of the space under the duct encompassed by the trolley so that the collectors and contactors within the trolley are completely shielded from outside the trolley. A more complete description of a duct configuration that is particularly suitable for use with the trolley of the instant invention may be had by reference to patent application Serial No. 164,247 filed on May 25, 1950, now Patent No. 2,675,434 and assigned to the assignee of the present invention.

Details of construction of the trolleys herein disclosed will best be understood upon reference to the appended drawings, wherein:

Fig. 3 is a section view as if on line 3—3 of Fig. 2.

Fig. 4 is a view of a modified form of the trolley of Fig. 1 showing parts cut away or removed to expose the interior of the trolley.

Fig. 5 is a section view as if on lines 5—5 of Fig. 4.

Fig. 6 is a view of a modified form of the trolley of Fig. 5 but showing part cut away.

Fig. 7 is a bottom plan view of the trolley showing parts cut away.

A trolley duct, more fully described in the aforementioned co-pending application, may include a casing made up of two halves 40—42. Each is of "ogee" form and has a central flange 43. Meeting flanges 43 may be riveted together by rivets 44 passed through rivet holes, some of which holes may be utilized to receive bolts or other fastening means enabling the duct to be connected to vertical hangers, not shown.

Figure 2:
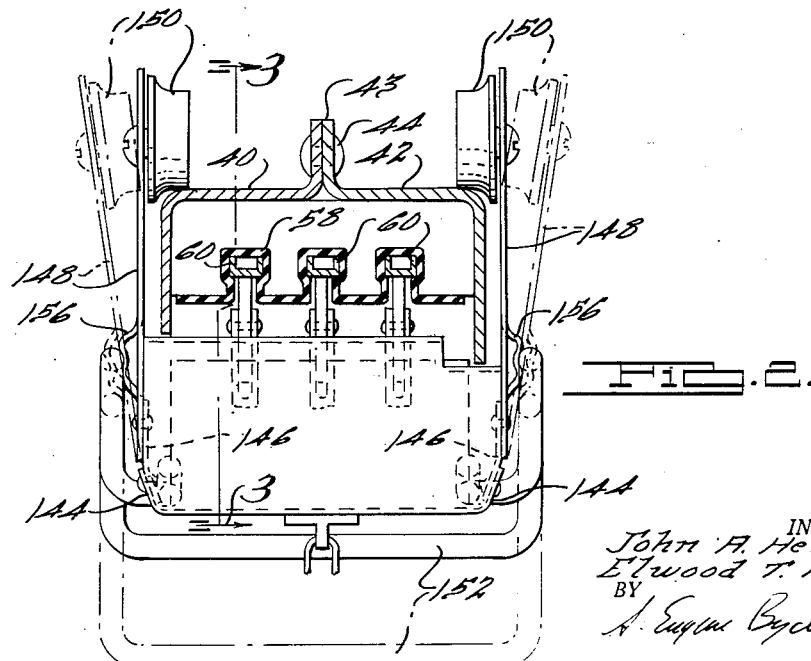
Fig. 2 is an end view as if on line 2—2 of Fig. 1 showing the trolley in place on the duct.

Running from end to end of each unit length is an insulation liner 58 of thin flexible insulation material rigid enough to be shape sustaining and self-supporting but flexible enough to be bent on longitudinal edges of its ridges to permit U-shaped bus bars 60 of the form shown in Figs. 2, 5 and 6 to be held by shoulders of the insulation liner 58.

For use with the open bottom channel type trolley duct briefly described, there is provided a trolley comprising a base or bottom plate 140 which may be made of sheet metal having bent up ends or end plates 142 and flanges 144 on its side edges. To these flanges 144 may be secured by leaf springs 146, side plates 148 near whose upper edges are pairs of rollers 150 for rolling along the upper surface of the casing halves 40—42 of the trolley duct, when the side plates 148 are in the duct engaged position of Fig. 2. This position may be established by movement of a bail 152 upwardly to the full-line position of Figs. 1–2 where its knee points 154 engage spring lugs 156 on the side plates 148 to bias these side plates towards each other and into duct engaged position. However, the bail 152 may be swung down to the dotted line position of Figs. 1 and 2 to release the lugs 156 and the side plates 148 and permit these to be biased outwardly by the leaf springs 146 and thus permit the trolley to be removed from or applied to a trolley duct.

Mounted upon the base plate 140 is an insulation block 160 (Fig. 3) having fuse clips 162 receiving cartridge fuses 164 and connected respectively to connector straps 166 and contact roller straps 168. Connector straps 166 are provided with binding screws 172 for terminals 174 of load conductors 175 clamped by a cable clamp 176 to the base 140 with cable 175 fastened by a cable clamp 178 (Fig. 1) to a strain relief chain 180 in turn fastened to the base 140 at 182, whereby longitudinal pull on cable 175 will be transmitted to the trolley through the chain 180 and cause movement of the trolley along the duct.

Straps 168 are connected to contactors 184, which may be in the form of rollers as illustrated, or any other form such as contactor bars, or shoes, which contactors move along the under surfaces of the bus bars 60 of the trolley duct and thus electrically engage the bus bars.

Figure 1:
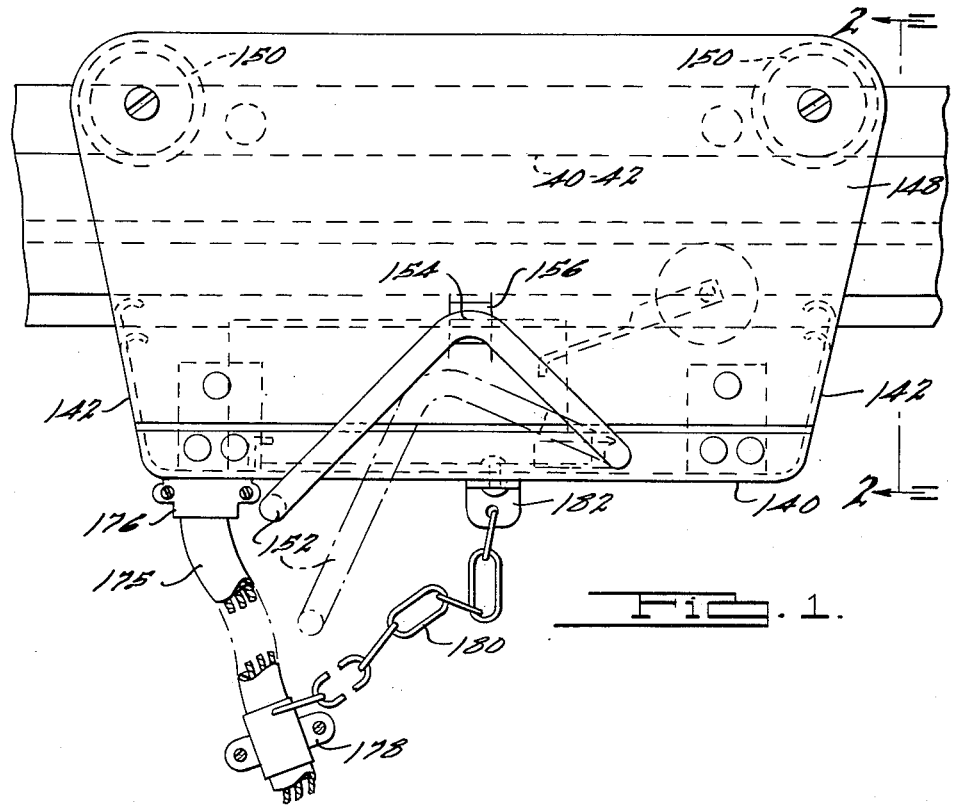
Fig. 1 is a side elevational view showing one form of trolley collector for the duct.

The trolley of Figs. 4 and 5 is generally similar to that heretofore described in connection with Figs. 1, 2 and 3 differing therefrom, however, in the arrangement for maintaining the side plates closely together to engage the trolley duct or to free the trolley from the trolley duct.

Thus, the trolley of Figs. 4 and 5 has a base 240 formed with end walls 242. To the longitudinal side edges of the base 240 are hingedly secured by hinges 244, side plates 248 having trolley engaging rollers 250. One side plate 248 is formed with a bail 251 which hooks over either of two hook portions 252—253 of lugs 254 secured to the other side plate 248 and the bail 251 has a knob 255 projecting through an opening 256 of the side plate 248. A spring 257 normally coerces the bail 251 in a downward direction to cause it to engage behind hooks 252 or 253 to mtaintain the side plates as close to each other as possible. However, the knob 255 may be moved upwardly, manually, in slot 256 of side plate 248 to lift the bail 251 from hooks 252 and thus free the side plates to be moved away from each other by the springs 258 around hinges 244.

The trolley of Figs. 6 and 7 is equipped with the connection block and other parts, such as the parts 160—184 shown in connection with the trolleys of Figs. 1 to 5 and such parts will not here be described, but the same reference numerals are employed in the trolley of Figs. 6 and 7 for the same parts employed in the trolley of Figs. 1 to 5.

Referring to Figs. 6 and 7, the trolley includes a base plate 340 having end walls 342 extending upwardly to the bottom of the duct (see Fig. 6) with downwardly turned lips 342a. The end walls 342 have pins 343 providing pivots for links 344 integrally connected to side plates 348 upon which are the rollers 350. The pairs of links 344 are centrally connected as at 351 and a bail 352 connects the central pin connections 351 with the bail extending longitudinally under the base plate 340. Projecting downwardly from the base plate, are lugs 353 having stop surfaces 354 and cam surfaces 355.

A spring 356 connects the bail 352 to base plate 340 and biases the bail to the right, Fig. 6.

Normally the bail is positioned under the stop lugs so that the stop surfaces 354 of these lugs are engaged by the bail 352 and this holds the central pivots 351 and links 344 down and thus holds the side plates 348 close to each other in the duct engaged position.

However, if the bail 352 is moved to the left manually, it moves up toward the base plate 340 and releases the central pivots 351 so that the links 344 can rock on their stationary pivots 343 and thus rock the side plates 348 outwardly to release the trolley. Spring 356 holds bail 352 against cam surfaces 355 of lugs 353. When the side plates are moved toward each other manually, i. e., towards closed or duct engaged position, they move the links so that the central pivots 351 move downwardly whereupon the bail will ride on the cam surfaces 355 of the lugs 353 projecting down from the base plate and cross over the intersections of surfaces 355—354 and hook under the stop surfaces 354 of these lugs 353 to restore the side walls to duct engaged position.

It will be observed that the trolleys hereof are designed especially for use with the open channel type of duct here disclosed and are formed to ride freely on the horizontal upper surface of such channel, with the collectors projecting upwardly from the bottom of the trolley to the bus bars through the open bottom of the channel. The bottom plates of the trolleys, together with the side plates and end plates, form a complete and effective shield around the collectors of the trolley and with the points of contact of such collectors with the duct bus bars.

We claim:
1. For use with a trolley duct having an open bottom channel casing with bus bars under the casing and exposed on their under surfaces, a trolley type collector including a bottom plate, two side plates movably connected thereto at their lower portions and having supporting rollers on and inside their upper portions for rolling on the top wall of the casing, bus bar contactors on the bottom plate projecting upwardly to engage the bus bars, and resilient means urging said side plates simultaneously to move away from each other thereby releasing said trolley collector for removal from said duct, disengageable locking means including a bail pivotally secured to said bottom plate and shaped for simultaneously moving both said side plates towards each other against the bias of said resilient means thus interlocking said rollers over the top wall of said casing.

2. For use with a trolley duct having an open bottom channel casing with bus bars under the casing and exposed on their undersurfaces, a trolley type collector including a bottom plate, two side plates movably connected thereto at their lower portions and having supporting rollers on and inside their upper portions for rolling on the top wall of the casing, bus bar contactors on the bottom plate projecting upwardly to engage the bus bars, and resilient means urging said side plates simultaneously to move away from each other thereby releasing said trolley collector for removal from said duct, disengageable locking means including a bail pivotally secured to said bottom plate and shaped for simultaneously moving both of said side plates towards each other against the bias of said resilient means thus interlocking said rollers over the top wall of said casing and end plates projecting upwardly from the ends of said bottom plate to the lower edges of said channel casing.

References Cited in the file of this patent

UNITED STATES PATENTS

| Number | Name | Date |
|---|---|---|
| 911,221 | Ellsworth | Feb. 2, 1909 |
| 2,170,298 | Frank | Aug. 22, 1939 |
| 2,439,986 | Rennie | Apr. 20, 1948 |
| 2,537,866 | Tanner | Jan. 9, 1951 |

FOREIGN PATENTS

| Number | Country | Date |
|---|---|---|
| 675,144 | Germany | May 3, 1939 |
| 443 of 1903 | Great Britain | Nov. 12, 1903 |